Figure 1:
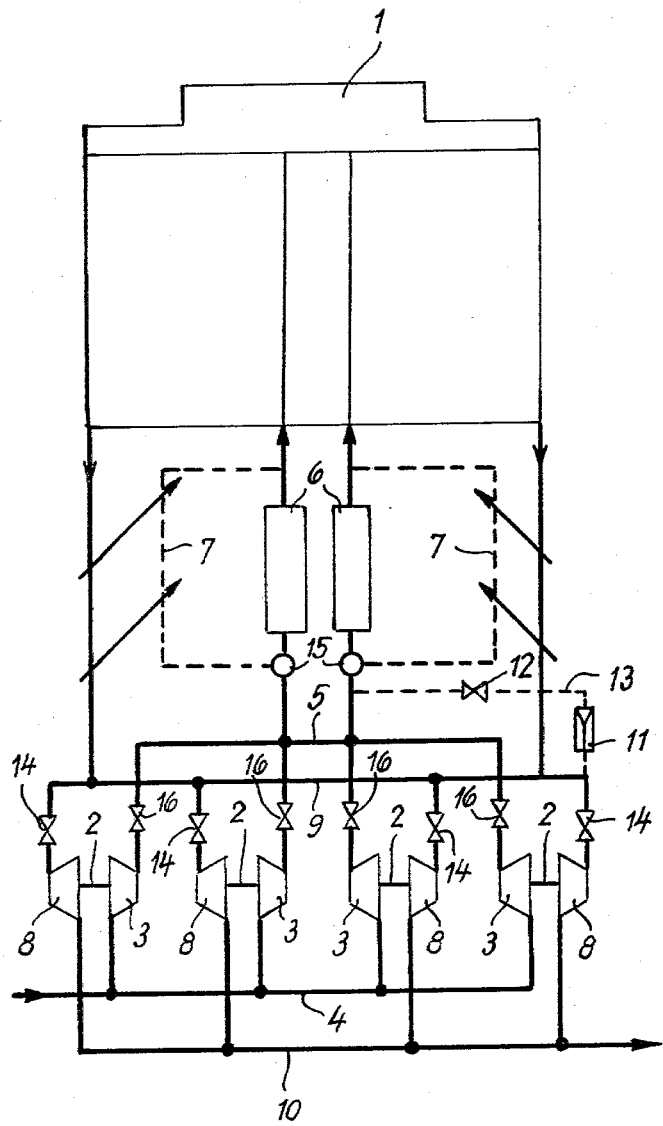

United States Patent [19]

Herschmann et al.

[11] 4,228,655
[45] Oct. 21, 1980

[54] INTERNAL COMBUSTION ENGINE AND A METHOD OF OPERATION THEREOF

[75] Inventors: Otto Herschmann, Bergisch Gladbach; Norbert Zernig, Cologne; Dieter Holthausen, Solingen; Hugo Stock; Paul Tholen, both of Bergisch Gladbach, all of Fed. Rep. of Germany

[73] Assignee: Klöckner-Humboldt-Deutz Aktiengesellschaft, Cologne, Fed. Rep. of Germany

[21] Appl. No.: 890,185

[22] Filed: Mar. 27, 1978

Related U.S. Application Data

[63] Continuation-in-part of Ser. No. 716,635, Aug. 23, 1976, abandoned.

[30] Foreign Application Priority Data

Aug. 26, 1975 [DE] Fed. Rep. of Germany ....... 2537863

[51] Int. Cl.³ ............................................. F02B 37/00
[52] U.S. Cl. ........................................ 60/602; 60/599; 60/612; 251/48; 251/137
[58] Field of Search .................... 60/602, 603, 612; 417/4, 5, 46; 415/151, 157, 158; 251/48, 137

[56] References Cited

U.S. PATENT DOCUMENTS

| | | | |
|---|---|---|---|
| 2,359,615 | 10/1944 | Browne et al. | 60/612 X |
| 2,380,777 | 7/1945 | Moss | 60/612 X |
| 2,444,644 | 7/1948 | Fullemann | 60/602 |
| 2,633,698 | 4/1953 | Nettel | 60/599 |
| 2,773,348 | 12/1956 | Grieshaber et al. | 60/612 X |
| 3,894,392 | 7/1975 | Melchior | 60/599 |

*Primary Examiner*—Michael Koczo
*Attorney, Agent, or Firm*—Becker & Becker, Inc.

[57] ABSTRACT

An internal combustion engine and a method of operation thereof in which a plurality of compressors are connected through check valves with the inlet means of the working chambers of the engine while the working chambers are connected through control valves and gas turbines, each of which drives a respective compressor. The control valves are arranged to open sequentially as engine speed increases and to close sequentially as engine speed decreases with the opening of each control valve taking place more rapidly and at a higher engine speed than the closing thereof. In starting the engine, only one of the turbine is supplied with gas to initiate a supply of compressed air for use in starting the engine.

5 Claims, 4 Drawing Figures

U.S. Patent  Oct. 21, 1980  Sheet 2 of 2  4,228,655

INTERNAL COMBUSTION ENGINE AND A METHOD OF OPERATION THEREOF

This is a continuation-in-part of co-pending application Ser. No. 716,635—Herschmann, et al filed Aug. 23, 1976 now abandoned.

The present invention relates to a method of operating internal combustion engines which form working chambers and which are provided with a plurality of parallel arranged exhaust gas turbo chargers which individually, depending on the operating conditions of the internal combustion engines are adapted at the gas and air side to be connected and disconnected, while the control elements on the exhaust gas side are when viewing the flowing direction located ahead of the exhaust gas turbine, and the control elements on the air side are when looking in flowing direction, arranged behind the chargers.

With internal combustion engines which are charged by exhaust gas turbo chargers and which have a wide range of the speed of operation, difficulties are encountered with regard to the acceleration behavior because the charging pressure is rather low within the lower range of the speed of rotation. In view of the torque in the lower speed range of rotation, the exhaust gas turbo charger has been designed for the intermediate speed of rotation. As a result thereof, in the upper speed range of rotation, the charging pressures increase to an unnecessarily high extent, and the transmission as well as the structural elements are exposed to correspondingly higher stresses. In an endeavor to overcome the above mentioned drawbacks, a bypass control is resorted to in the upper speed range of rotation, according to which a portion of the exhaust gas bypasses the turbine. This method, however, is uneconomical inasmuch as it results in a higher fuel consumption. German Pat. No. 850965 describes a method of the above mentioned type according to the operational conditions of the internal combustion engine. This method, however, has not generally been adapted in the art because each time an exhaust gas turbo charger has to be connected up, it is necessary to pass through the pumping limit of the charger which affects the useful life of the latter.

It is, therefore, an object of the present invention with a method of the above mentioned type to improve the acceleration behavior of the internal combustion engine and to keep as low as possible the harmful influences when connecting up or disconnecting the exhaust gas turbo charger.

This object and other objects and advantages of the invention will appear more clearly from the following specification in connection with the accompanying drawing diagrammatically illustrating the construction of an internal combustion engine with exhaust gas turbo chargers for practicing the method according to the present invention. The method according to the invention is characterized primarily in that when connecting up an exhaust gas turbo charger, the control element on the gas side opens as quickly as possible, whereas it closes slowly when the exhaust gas turbo charger is disconnected. The practicing of the method according to the present invention brings about that the speeding up of the connected up exhaust gas turbo charger is effected at a considerably shorter time because the pressure wave is able fully to act upon the turbine. Since furthermore in view of the employment of a plurality of small chargers, the pressure steps in the system remain low and the inertia moments of the charging groups are small, it is possible to pass through the pumping limits in fractions of seconds, approximately 0.4 seconds. The flow-back process can thus take place within a very short time and consequently does not endanger the blades. During the turning-off operation, the control elements close slowly so that the turbine blades will not be damaged by underpressure vibrations.

According to a further development of the invention, it is suggested that the connecting operation is effected at a higher speed of rotation of the internal combustion engine than is the case with the turning-off process. As a result thereof, a higher exhaust gas energy is available for the acceleration process of the connected-up turbine than would be possible from the stationary operation. Furthermore, a continuous connecting-up and turning off will be prevented when the internal combustion engine operates at an approximately constant speed within the shifting range.

For improving the acceleration during the starting operation within the lower speed range of rotation, it is expedient to provide a combustion chamber within the exhaust gas system. In view of the expenses for additional structural elements and operational costs, it is advantageous that the combustion chamber is designed only for one exhaust gas turbo charger and that only one exhaust gas turbine is additionally acted upon by the combustion gases of the combustion chamber.

In order to be able to take full advantage of the advantages of the method according to the present invention, the control has to meet high requirements. Therefore, according to a further development of the invention, it is suggested that the connecting and turning-off operations as well as the actuation of the combustion chamber are electronically controlled in conformity with the respective influential factors corresponding to the working point of the internal combustion engine in the characteristic field of operation, by electrical, hydraulic or pneumatic control elements.

IN THE DRAWINGS

FIG. 1 illustrates schematically engine control features in accordance with the present invention.

Figure 2:
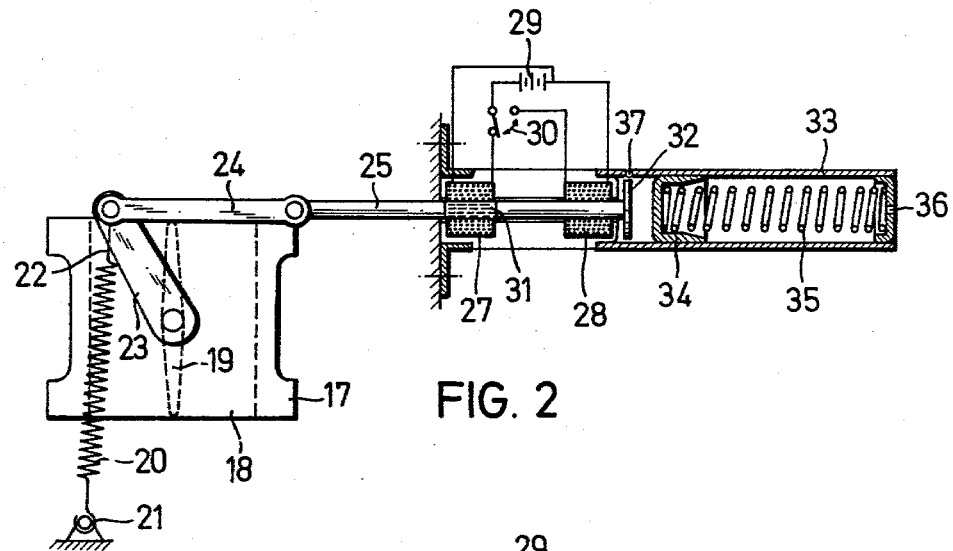
Figure 3:
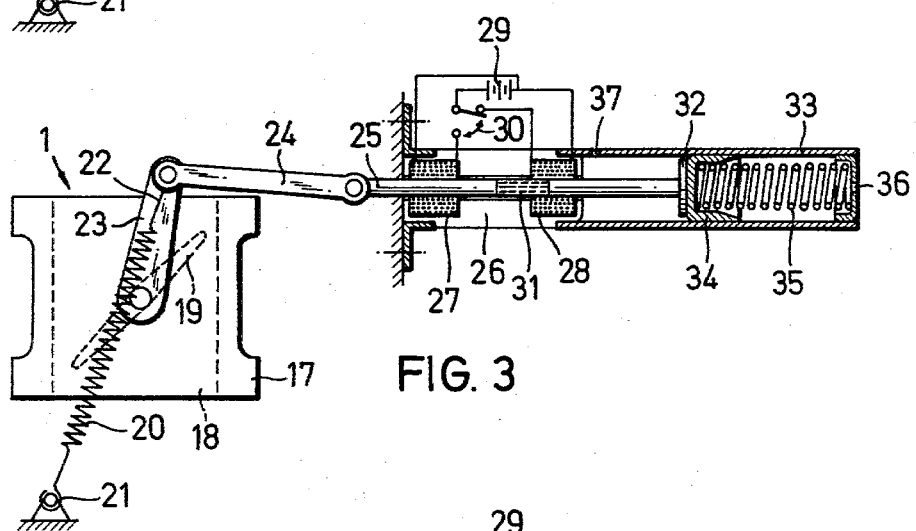
Figure 4:
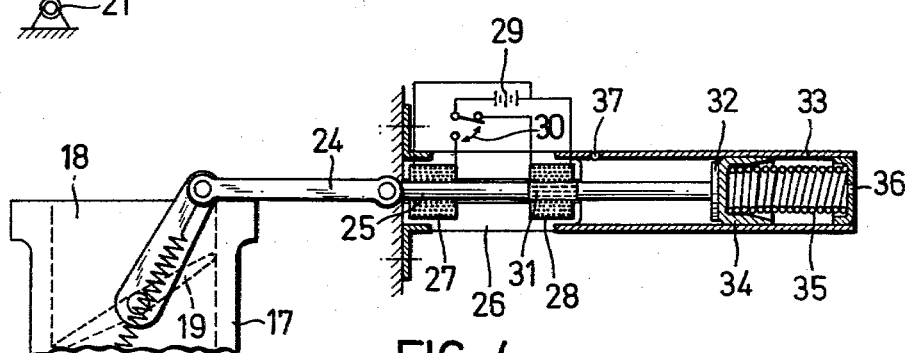

FIGS. 2, 3, and 4 show different positioning of control valve operations for the present invention.

Referring now to the drawings in detail, an internal combustion engine 1 forming the working chamber is charged by four exhaust gas turbo chargers 2 which are arranged in parallel. The compressors 3 of the exhaust gas turbo chargers 2 draw in fresh air through a common intake line 4 and convey said fresh air to a common pressure line 5. From here the compressed air, depending on the operational conditions, passes either through intermediate coolers 6 or exhaust gas heat exchangers 7 into the internal combustion engine. On the exhaust gas side, exhaust gas turbines 8 are connected to a common pressure line 9 and to a common discharge conduit 10. In addition to the exhaust gases of the internal combustion engine, an exhaust gas turbine 8 is acted upon by the combustion gases of a combustion chamber 11 which is controlled by a control valve 12 arranged in a connecting line 13 between the combustion chamber and the compressed air system. In the pressure lines of the compressor 3, check valves 16 are arranged which in response to a drop in the conveying pressure, close the respective connecting line to the common pressure line 9. In the pressure line on the exhaust gas side, control devices 14 are provided ahead of each exhaust gas turbine 8. By means of said control devices 14, it is possible to throttle and if desired to interrupt the flow of the exhaust gas through the exhaust gas turbines 8. The control valves 14 are so designed that they open quickly but only slowly decrease the flow-through cross section.

The method according to the present invention operates as follows. Prior to the start of the internal combustion engine 1, the combustion chamber 11 is started and operates the exhaust gas turbine 8 connected thereto. Turbine 8 drives the corresponding compressor 3, while the remaining exhaust gas turbo charges 2 are turned off on the air and exhaust gas side. When a sufficient charging pressure has been reached, the internal combustion engine 1 is started. In this connection, the pre-compressed air is conveyed through the exhaust gas heat exchangers 7. When reaching a pre-selected speed or another influential factor has been realized, for instance a desired exhaust gas temperature, combustion chamber temperature, exhaust gas pressure, etc., the control valve 14 of the adjacent exhaust gas turbo charger is suddenly opened. By means of the exhaust gas pressure wave, the exhaust gas turbine 8 is quickly accelerated, and the pertaining compressor 3 will within fractions of seconds generate a pressure equalling the pressure prevailing in the common pressure line 9 so that the check valve 16 will open. Corresponding to the respective characteristic operational values of the internal combustion engine 1, more or less exhaust gas turbo chargers 2 are connected up. The connecting-up operation is effected at a higher speed of the internal combustion engine than the disconnecting operation. The disconnecting operation is effected by a slow closing of the control valve 14 whereby the speed of the exhaust gas turbine 8 drops slowly and the conveying pressure of the pertaining compressor 3 decreases. If the conveying pressure of the compressor 3 drops below the pressure in the common pressure line 9, the check valve 16 and the exhaust gas turbo charger 2 are turned off on the air side. For realizing the desired charging air temperature during the operation of the internal combustion engine, the precompressed air is by means of a bypass valve 15 partially or completely passed through the charging air coolers 6 instead of being passed through the exhaust gas heat exchanger 7.

The U.S. Pat. Nos. 2,380,777—Moss issued July 31, 1945, and 2,359,615—Browne issued Oct. 3, 1944, et al—show combustion machines with exhaust gas turbo chargers as preconditioned in the introductory wording of the disclosure and claims. Conventionally shifting elements are provided which also can be used with the teaching of the present invention. The present invention in contrast concerns a method for operation of such known combustion machine particularly in such a manner that during additive connection of an exhaust gas turbo charger, the shifting element on the gas side opens as quickly as possible while being closed slowly during turning-off thereof. For this purpose the known shifting elements are provided with corresponding control devices which make possible a corresponding regulation.

Such control devices are multiply known in the technique of control or regulation so that these devices can be utilized without difficulty by every expert or man skilled in the art, as soon as he knows which procedure he should control thereby.

A possibility exists, for example, therein to actuate a valve respectively, a shift member or plunger by means of a control cam respectively, a curved disc providing a steep opening flank, and a flat closing flank. Furthermore, the installation of regulatable adjusting motors of the pneumatic, hydraulic, or electric type is conceivable for a higher adjusting speed during the opening procedure than during the closing procedure. Such control or regulation procedure can be embodied in a more simple, straight forward manner by way of throttle and storage means respectively, by way of a resistance and capacitors suitable for the corresponding requirements.

Furthermore, it is conceivable with adjusting drives with equal turning speed coupling drives or the like intermediate connections with which the linkage point connected with the valve has a lower speed during the closing movement than during the opening movement.

The number of possible embodiments is nearly unlimited so that the expert or average man skilled in the art has a very large selection for the concrete embodiment of the inventive method. German disclosure No. 1,195,115—Herion dated June 16, 1965, especially in FIG. 2, shows a pneumatic control shifting element with which the requirements of the inventive method can be fulfilled.

None of the references shows or suggests a combustion machine operation in the inventive manner. The multiplicity of known control or regulating elements belonging to the background of knowledge of every expert or man skilled in the art of regulation, can not make obvious a particular control method of a combustion machine only because those known control elements are used in a particular manner.

The control valve 14 is illustrated in detail in FIGS. 2, 3, and 4. The control valve 14 has a housing 17 with an exhaust flu or passage 18 in which a control flap 19 is pivotally journalled. A toggle switch spring 20 supported at one end 21 rigidly as to the housing engages with the free end 22 against a lever 23 fastened on the control flap 19 and holds the control flap 19 stable in the particular switching position. On the lever 23 there is additionally connected or linked an actuating element 24 which is articulately connected with an armature or anchor 25 of an electromagnet 26. The electromagnet 26 provides two induction coils 27 and 28 which can be energized alternately from a current source 29. A double throw switch 30 serves for alternate energization and is actuated dependent upon the determinative operating sizes or magnitudes of the combustion engine.

The armature 25 consists of a ferro magnetic work material in a longitudinal section 31 which is attracted by the particular energized induction coil. The free end of the armature 25 is embodied as a ram, striker, plunger or push rod 32. The armature 25 and push rod 32 are guided in common in a pneumatic cylinder 33.

FIG. 2 shows an operating condition with which the control flap 19 is open. Under these circumstances the induction coil 27 is energized while the current circuit of the induction coil 28 is interrupted. If now the double-throw switch is shifted or switched and the induction coil 28 is energized, the armature 25 moves against the force of the toggle switch spring 20 in the direction of the induction coil 28, whereby the push rod 32 according to a short shifting path comes into engagement against a collar piston 34 which retracts against the force of a spring 35 and accordingly conveys air out of the pneumatic cylinder 33 by way of a throttle bore 36.

FIG. 3 illustrates a position of the control valve in which the control flap 19 is already closed half way. Since the spring 35 and the air displaced from the pneumatic cylinder 33 is effective counter to the force of the electromagnet 26, the closing movement of the control flap 19 occurs only very slowly.

FIG. 4 shows the control flap 19 in closure positioning. If now the double-throw switch 30 is brought into its starting position, the induction coil 27 is energized and attracts the armature 25 in its direction. Accordingly the push rod 32 lifts or separates from the collar piston 34 so that the switching procedure can be carried out in the shortest time without resistance. The initially weak double-throw switch spring 20 stabilizing the closure positioning of the control flap supports the opening movement of the control flap 19 after exceeding of the pivot or tilting point. The collar piston 34 is pushed back into its starting position by the spring 35 whereby the air escapes from the hydraulic cylinder 33 from an equalizing bore 37. By change of the throttle bore and the spring characteristic of the spring 35, the closure speed of the control flap 19 can be varied.

It is, of course, to be understood that the present invention is, by no means, limited to the specific showing in the drawing, but also comprises any modifications within the scope of the appended claims.

What is claimed is:

1. The method of operating an internal combustion engine having working chambers to which fuel and combustion air are supplied and from which exhaust gases are discharged which comprises the steps of: supplying the exhaust gases from said chambers to the inlet sides of a plurality of turbines having blades with each turbine connected to drive a respective compressor, connecting the outlet sides of the compressors with said chambers, interposing gas flow control elements for opening faster than closing in the connections which supply exhaust gases to the inlet sides of said turbines, opening rapidly the control element on the inlet side of a said turbine to start the turbine, and closing the control element at a rate sustantially slower than the opening rate thereof when stopping the turbine so that the turbine blades will not be damaged by underpressure vibrations.

2. The method according to claim 1 in which the control element on the inlet side of each turbine opens at a higher engine speed than the respective control element closes.

3. The method according to claim 2 wherein the control of the opening and closing of the control elements in at least the inlet sides of said turbines is effected automatically in conformity with predetermined characteristic speed-pressure operational valves.

4. In combination; an engine having working chambers to which fuel and combustion air are supplied, a plurality of compressors and a plurality of gas turbines having blades and each drivingly connected to a respective compressor, first connections connecting the outlets of said compressors to said working chambers and second connections connecting the said working chambers to the inlet sides of said gas turbines, control valves for opening faster than closing in said second connections each operative to open and close, and means for opening rapidly said control valves on the inlet side, and closing said control valves sequentially as the operating conditions of the engine change at a rate substantially slower than the opening rate thereof so that the turbine blades will not be damaged by underpressure vibrations.

5. A combination according to claim 4, which includes means for opening each control valve at a respective speed of said engine and for closing the respective control valve at a lower engine speed.

* * * * *